US009354746B2

(12) United States Patent
Yoshikawa et al.

(10) Patent No.: US 9,354,746 B2
(45) Date of Patent: May 31, 2016

(54) CAPACITIVE TOUCH PANEL

(71) Applicants: SMK Corporation, Tokyo (JP); KABUSHIKI KAISHA TOKAI RIKA DENKI SEISAKUSHO, Aichi (JP)

(72) Inventors: Osamu Yoshikawa, Tokyo (JP); Takao Imai, Aichi (JP); Syogo Yamaguchi, Aichi (JP)

(73) Assignees: SMK Corporation, Tokyo (JP); KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/285,647

(22) Filed: May 23, 2014

(65) Prior Publication Data

US 2015/0091852 A1   Apr. 2, 2015

(30) Foreign Application Priority Data

Sep. 30, 2013 (JP) ................................ 2013-203873

(51) Int. Cl.
    *G06F 3/045* (2006.01)
    *G06F 3/041* (2006.01)
    *G06F 3/044* (2006.01)

(52) U.S. Cl.
    CPC ............. *G06F 3/0418* (2013.01); *G06F 3/044* (2013.01); *G06F 2203/04101* (2013.01); *G06F 2203/04112* (2013.01)

(58) Field of Classification Search
    CPC ..... G06F 3/0416; G06F 3/0418; G06F 3/044; G06F 2203/04101; G06F 2203/04104; G06F 2203/04112

USPC .................................................. 345/173–174
See application file for complete search history.

(56) References Cited

U.S. PATENT DOCUMENTS

| 2010/0149110 A1* | 6/2010 | Gray ..................... G06F 3/0416 345/173 |
| 2011/0298479 A1 | 12/2011 | Matsushima |
| 2012/0146940 A1 | 6/2012 | Yamamoto et al. |

(Continued)

FOREIGN PATENT DOCUMENTS

| JP | H7-129308 A | 5/1995 |
| JP | 2001-125744 A | 5/2001 |

(Continued)

OTHER PUBLICATIONS

Extended European Search Report for European Patent Application No. 14170373.6, issued by the European Patent Office on Oct. 9, 2014.

(Continued)

*Primary Examiner* — Towfiq Elahi

(57) ABSTRACT

A plurality of detection electrodes S(n) are allocated to any one of two or more detection electrode groups SG(k) so that the detection electrodes S(n) to be allocated to each of the detection electrode groups SG(k) are disposed at equal intervals and spaced apart from each other by at least one detection electrode S(n) in the direction of detection. In each of the two or more detection electrode groups SG(k), the detection electrodes S(n) allocated to the detection electrode group SG(k) are sequentially selected in the direction of detection so as to compare the detection voltage levels R(n) that each appear on a set of detection electrodes S(n) and S(n+1) that are adjacent to each other in the direction of detection.

9 Claims, 4 Drawing Sheets

(56) References Cited

U.S. PATENT DOCUMENTS

| | | |
|---|---|---|
| 2012/0206407 A1 | 8/2012 | Taylor et al. |
| 2012/0306802 A1 | 12/2012 | McCracken |
| 2013/0162565 A1 | 6/2013 | Kim et al. |
| 2013/0249853 A1* | 9/2013 | Tanaka .................. G06F 3/0416 345/174 |
| 2013/0285974 A1 | 10/2013 | Nakabayashi et al. |
| 2014/0028626 A1 | 1/2014 | Maeda et al. |

FOREIGN PATENT DOCUMENTS

| | | |
|---|---|---|
| JP | 2002-215314 A | 8/2002 |
| JP | 4955116 B1 | 3/2012 |
| JP | 2012-248035 A | 12/2012 |
| WO | 2012/176857 A1 | 12/2012 |

OTHER PUBLICATIONS

Office Action for European Patent Application No. 14170373.6, issued by the European Patent Office on Sep. 8, 2015.

Office Action issued for counterpart Japanese Application 2013-203873, issued by the Japan Patent Office on Oct. 27, 2015.

* cited by examiner

| | | D1 | D2 | D3 | D4 | D5 | D6 | D7 | D8 | D9 | D10 | D11 | D12 | D13 | | S1 | S2 | S3 | S4 | S5 | S6 | S7 | S8 | S9 | S10 | S11 | S12 |
|---|---|---|---|---|---|---|---|---|---|---|---|---|---|---|---|---|---|---|---|---|---|---|---|---|---|---|---|
| Tp1 | DV(1) | ON | ON | ON | | | | | | | | | | | SG(1) | 1 | | 2 | | 3 | | 4 | | 5 | | 6 | |
| | DV(2) | | | ON | ON | ON | | | | | | | | | SG(2) | | 7 | | 8 | | 9 | | 10 | | 11 | | 12 |
| | DV(3) | | | | | ON | ON | ON | | | | | | | SG(1) | 1 | | 2 | | 3 | | 4 | | 5 | | 6 | |
| | DV(4) | | | | | | | ON | ON | ON | | | | | SG(2) | | 7 | | 8 | | 9 | | 10 | | 11 | | 12 |
| | DV(5) | | | | | | | | | ON | ON | ON | | | SG(1) | 1 | | 2 | | 3 | | 4 | | 5 | | 6 | |
| | DV(6) | | | | | | | | | | | ON | ON | ON | SG(2) | | 7 | | 8 | | 9 | | 10 | | 11 | | 12 |
| Tp2 | DV(1) | ON | ON | ON | | | | | | | | | | | SG(2) | | 1 | | 2 | | 3 | | 4 | | 5 | | 6 |
| | DV(2) | | | ON | ON | ON | | | | | | | | | SG(1) | 7 | | 8 | | 9 | | 10 | | 11 | | 12 | |
| | DV(3) | | | | | ON | ON | ON | | | | | | | SG(2) | | 1 | | 2 | | 3 | | 4 | | 5 | | 6 |
| | DV(4) | | | | | | | ON | ON | ON | | | | | SG(1) | 7 | | 8 | | 9 | | 10 | | 11 | | 12 | |
| | DV(5) | | | | | | | | | ON | ON | ON | | | SG(2) | | 1 | | 2 | | 3 | | 4 | | 5 | | 6 |
| | DV(6) | | | | | | | | | | | ON | ON | ON | SG(1) | 7 | | 8 | | 9 | | 10 | | 11 | | 12 | |

FIG. 3

CAPACITIVE TOUCH PANEL

CROSS REFERENCE TO RELATED APPLICATION

The contents of the following Japanese patent application are incorporated herein by reference, NO. 2013-203873 filed on Sep. 30, 2013.

FIELD

The present invention relates to capacitive touch panels which detect the position of an input operation from the position of a detection electrode disposed on an insulating panel at which the capacitance of the detection electrode is varied by an input operation object approaching the same, and more particularly to a capacitive touch panel which detects the input operation position with reliability without being affected by noise.

BACKGROUND

The capacitive touch panels which detect the position of an input provided by an input operation object such as a finger are classified into a self-capacitance scheme (one-wire type) and a mutual capacitance scheme (two-wire type). The self-capacitance scheme is configured to detect a detection electrode that is increased in stray capacitance by an input operation object approaching the same and thereby detect the position of an input operation from the position at which the detection electrode is disposed. The mutual capacitance scheme is configured to apply a detection voltage at a predetermined voltage level to a drive electrode and detect a detection electrode of which detection voltage level is reduced by an input operation object approaching the same so as to detect the position of an input operation from the position at which the detection electrode is disposed. The former scheme provides a simplified structure because no drive electrode is employed, but detects stray capacitance at an infinitesimal level of 10 to 20 pF with difficulty. Thus, in general, the latter mutual capacitance scheme is employed.

The capacitive touch panel that employs the mutual capacitance scheme is configured such that a plurality of drive electrodes to which a detection voltage is applied and a plurality of detection electrodes for detecting a detection voltage level are disposed to be orthogonal to each other; a detection voltage level is monitored at each position of intersection at which a drive electrode and a detection electrode intersects; and the position of an input operation is detected from the position of intersection of the detection electrode at which the detection voltage level is reduced by an input operation object approaching the same (for example, Patent Literature 1).

Such a capacitive touch panel is configured to detect the position of an input operation on the basis of a very small change in the capacitance of the detection electrode, and thus vulnerable to a clock noise occurring on the display device stacked on the front or rear surface or a common mode noise caused by the commercial AC power supply. Thus, these types of noises would lead to an erroneous detection of the input operation position.

As a method for eliminating these noises in order to improve the accuracy of detection of an input operation position, suggested in Patent Literature 2 is a touch panel which extracts an AC signal component as a noise signal from an analog signal that was detected by a sensor in order to detect the input operation position, inverts the resulting signal in phase by 180° and then adds it to the original analog signal, and detects the input operation position from the resulting analog signal with the noise signal cancelled out.

Furthermore, disclosed in Patent Literature 3 is a capacitive touch panel which includes, on the same input operation surface of the touch panel, a main sensor unit for detecting an input operation position and a sub-sensor unit for eliminating noise. The capacitive touch panel disclosed in Patent Literature 3 is configured such that various types of noise signals that occur in the vicinity of the input operation surface are received both by the main sensor unit and the sub-sensor unit, and accordingly, a subtraction unit subtracts the signal received by the sub-sensor unit from the signal received by the main sensor unit so as to eliminate the noises, and then the output from the subtraction unit that includes only a signal provided by an input operation is used to detect the input operation position.

CITATION LIST

Patent Literature

Patent Literature 1 Japanese Patent Application Publication No. 2012-248035
Patent Literature 2 Japanese Patent Application Publication No. 2001-125744
Patent Literature 3 Japanese Patent No. 4955116

SUMMARY

Technical Problem

The touch panel disclosed in Patent Literature 2 above is configured such that the natural frequency and amplitude to be defined as noise have to be pre-stored in a filter so as to identify a noise signal. Therefore, a noise signal that is not defined as the noise cannot be removed. Furthermore, since an input operation position is detected from the original analog signal after the noise was eliminated by feedback, an additional processing time for removal of the noise makes it impossible to detect the input operation position at high speeds.

Furthermore, the capacitive touch panel disclosed in Patent Literature 3 is configured such that the sub-sensor unit needs to be provided in addition to the main sensor unit in order to detect an input operation position. In particular, since the capacitive touch panel has a number of main sense lines (detection electrodes) and a number of drive lines (drive electrodes) which cross each other in a matrix, a complicated pattern of lines is required to dispose, on the same input operation surface, the sub-sense lines from the sub-sensor unit in electrical isolation from the main sense and drive lines, thus making the structure complicated and making the manufacturing process of the touch panel intricate.

Furthermore, signals on the sub-sense lines are subtracted from signals detected on all the main sense lines. Thus, since the aforementioned subtraction process is performed on each sense line, an increase in the number of main sense lines to be disposed due to an increase in the input operation surface would cause the time for detecting an input operation position to be elongated. Thus, the position of an input operation cannot be detected at high speeds.

The present invention was developed in view of such conventional problems. It is therefore an object of the present invention to provide a capacitive touch panel which readily determines a noise signal to thereby detect an input operation position with high accuracy without a significant change made to the structure of a conventional touch panel.

It is another object of the present invention to provide a capacitive touch panel which is capable of detecting an input operation position at high speeds without a significant change made to the structure of a conventional touch panel even when the input operation surface has an increased area.

Solution to Problem

To achieve the aforementioned objects, a capacitive touch panel according to a first aspect of the present invention includes: a plurality of detection electrodes S(n) disposed at equal intervals in a direction of detection on an insulating panel; a detection voltage generation circuit for generating an AC detection voltage; drive electrodes disposed to be insulated from the plurality of detection electrodes S(n); a drive control unit for applying a detection voltage to the drive electrodes; electrode select means for selecting a particular detection electrode S(n) sequentially from the plurality of detection electrodes S(n); capacitance detection means for detecting a detection voltage level R(n) of a detection voltage appearing on a detection electrode S(n) selected by the electrode select means; and position detection means for identifying a detection electrode S(n) from the plurality of detection electrodes S(n), the detection electrode S(n) having a detection voltage level R(n) varied due to a change in capacitance between the selected detection electrode S(n) and a drive electrode in the vicinity thereof to which the detection voltage is applied, the change being caused by an input operation object approaching the detection electrode S(n), the position detection means detecting an input operation position of the input operation object from a position at which the identified detection electrode S(n) is disposed in the direction of detection on the insulating panel. The capacitive touch panel is further configured such that the electrode select means allocates the plurality of detection electrodes S(n) to any one of two or more detection electrode groups SG(k) so that the detection electrodes S(n) allocated to each detection electrode group SG(k) are disposed at equal intervals and spaced apart from each other at least by one detection electrode S(n) in the direction of detection, and, in each of the two or more detection electrode groups SG(k), sequentially selects the detection electrodes S(n) allocated to the detection electrode group SG(k) in the direction of detection; and the position detection means makes a comparison between detection voltage levels R(n) each appearing on a set of detection electrodes S(n) and S(n+1) which are adjacent in the direction of detection to the detection electrode S(n) having a varied detection voltage level R(n), and identifies the detection electrode S(n) which is varied in detection voltage level R(n) by an approach of the input operation object.

The detection electrodes S(n) adjacent to each other along the direction in which the electrodes are disposed are allocated to different detection electrode groups SG(k), and the capacitance detection means detects, in each detection electrode group SG(k), the detection voltage levels R(n) of the detection electrodes S(n) allocated to the detection electrode group SG(k). Thus, the detection voltage levels R(n) of the adjacent detection electrodes S(n) are each detected after a lapse of at least the select period for each detection electrode group SG(k), and an impulse noise that occurs within one select period appears on the detection voltage level R(n) of only one of the adjacent detection electrodes S(n). On the other hand, the input operation manipulation time required for an approach of an input operation object is far greater than one select period. Thus, among those detection electrodes S(n) of which detection voltage level R(n) is varied, it is possible to easily distinguish a detection electrode S(n) of which detection voltage level R(n) is varied by an approach of the input operation object from a detection electrode S(n) of which detection voltage level R(n) is varied due to noise. This allows for identifying the detection electrode S(n) which the input operation object approaches and accurately detecting the input operation position of the input operation object irrespective of the occurrence of noise.

The capacitive touch panel according to a second aspect is configured such that the electrode select means alternately allocates the plurality of detection electrodes S(n) one by one to two types of detection electrode groups SG(1) and SG(2) in the direction of detection; and when the electrode select means selects a detection electrode S(n) allocated to one of the detection electrode groups SG(1) and SG(2), the drive control unit employs, as a drive electrode, at least either one of detection electrodes S(n+1) and S(n+1) which are allocated to the other detection electrode group SG(2) or SG(1) and disposed on both the sides of the selected detection electrode S(n) in the direction of detection, and applies a detection voltage thereto.

While the electrode select means selects a detection electrode S(n) allocated to one detection electrode group and the capacitance detection means detects the detection voltage level R(n) of the selected detection electrode S(n), the detection electrodes S(n−1) and S(n+1) disposed on both the sides of the selected detection electrode S(n) are allocated to the other detection electrode group and not selected as a detection electrode for detecting the detection voltage level R(n). Thus, meanwhile, at least either one of the detection electrodes S(n−1) and S(n+1) disposed on both the sides can be employed as a drive electrode to which the detection voltage is applied.

The capacitive touch panel according to a third aspect of the invention is configured such that the drive control unit applies an inverted detection voltage having an opposite phase with respect to the detection voltage to at least one of the detection electrodes S(n).

The AC signals at the detection voltage and the inverted detection voltage cancel out each other on the insulating panel.

The capacitive touch panel according to a fourth aspect of the invention is configured such that with at least either one of the detection electrodes S(n−1) and S(n+1) employed as a drive electrode, the drive control unit applies the inverted detection voltage having an opposite phase with respect to the detection voltage to at least either one of detection electrodes S(n−2) and S(n+2) which are allocated to one of the detection electrode groups SG(1) and SG(2) and disposed on both the sides of the detection electrodes S(n−1) and S(n+1) in the direction of detection.

An AC signal at the inverted detection voltage which cancels out the detection voltage flows through the detection electrodes S(n−2) and S(n+2) disposed on both the sides of the detection electrodes S(n−1) and S(n+1) to which the detection voltage is applied.

The capacitive touch panel according to a fifth aspect of the invention is configured such that when the electrode select means selects a detection electrode S(n) allocated to one of the detection electrode groups SG(1) and SG(2), the drive control unit employs, as a drive electrode, at least either one of detection electrodes S(n+1) and S(n+3) which are allocated to the other detection electrode group SG(2) or SG(1) and disposed on both the sides along the direction of detection of a detection electrode S(n+2) to be selected subsequent to the selected detection electrode S(n), and applies a detection voltage thereto.

While the detection voltage level R(n) of the selected detection electrode S(n) is being detected, the detection voltage is applied in advance to at least either one of the detection electrodes S(n+1) and S(n+3) on both the sides of the detection electrode S(n+2) of which detection voltage level R(n) is to be subsequently detected. The detection of the detection voltage level R(n) appearing on the next detection electrode S(n+2) is not affected by the application of the detection voltage to a switched drive electrode.

The capacitive touch panel according to a sixth aspect of the invention is configured such that with at least either one of the detection electrodes S(n+1) and S(n+3) employed as a drive electrode, the drive control unit applies the inverted detection voltage having an opposite phase with respect to the detection voltage to at least either one of detection electrodes S(n+2) and S(n+4) which are allocated to one of the detection electrode groups SG(1) and SG(2) and disposed on both the sides of the detection electrode S(n+3) in the direction of detection.

An AC signal at the inverted detection voltage which cancels out the detection voltage flows through the detection electrodes S(n+2) and S(n+4) disposed in the vicinity of the detection electrodes S(n+1) and S(n+3) to which the detection voltage is applied.

The capacitive touch panel according to a seventh aspect of the invention is configured such that the electrode select means operates in either one mode selectable from a typical mode of operation in which the detection electrodes S(n) allocated to two or more detection electrode groups SG(k) are sequentially selected in each of the detection electrode groups SG(k) in the direction of detection and a high-speed mode of operation in which the detection electrodes S(n) allocated to only any one of the detection electrode groups SG(k) are sequentially selected in the direction of detection.

The detection electrodes S(n) allocated to each detection electrode group SG(k) are disposed at equal intervals in the direction of detection generally on the entire input operation region. It is thus possible to detect an input operation position on the entire input operation region by a detection voltage level R(n) detected only on the detection electrodes S(n) allocated to any one of the detection electrode groups SG(k).

When the electrode select means operates in the high-speed mode of operation, the detection voltage levels R(n) appearing on the detection electrodes S(n) allocated to only any one of detection electrode groups SG(k) are detected. Thus, one scanning period is shortened, and the input operation position can be detected at high speeds.

A capacitive touch panel according to claim an eighth aspect of the invention includes: a plurality of detection electrodes S(n) which are disposed on an insulating panel in a second direction orthogonal to a first direction so as to be at equal intervals in the first direction; a detection voltage generation circuit for generating an AC detection voltage; a plurality of drive regions DV(m) which are disposed in the first direction so as to be at equal intervals in the second direction of the insulating panel, the drive regions DV(m) intersecting all the plurality of detection electrodes S(n) with an insulation separation therebetween; a drive control unit for selecting a particular drive region DV(m) from the plurality of drive regions DV(m) and applying a detection voltage to the selected drive region DV(m); electrode select means for selecting a particular detection electrode S(n) sequentially from the plurality of detection electrodes S(n); capacitance detection means which, when the drive control unit applies the detection voltage to the selected drive region DV(m), detects a detection voltage level R(n, m) of a detection voltage appearing on the detection electrode S(n) selected by the electrode select means; and position detection means for identifying, from the plurality of detection electrodes S(n), a detection electrode S(n) of which detection voltage level R(n, m) is varied due to a change in capacitance caused by an approach of an input operation object between the selected detection electrode S(n) and the drive region DV(m) in the vicinity thereof to which the detection voltage is applied, the position detection means detecting an input operation position in the first direction and the second direction of the input operation object from a position (n) at which the identified detection electrode S(n) is disposed in the first direction on the insulating panel and a position (m) at which the drive region DV(m) with the detection voltage applied thereto is disposed in the second direction on the insulating panel. The capacitive touch panel is further configured such that the electrode select means allocates the plurality of detection electrodes S(n) to any one of two or more detection electrode groups SG(k) so that the detection electrodes S(n) to be allocated to each of the detection electrode groups SG(k) are disposed at equal intervals and spaced apart from each other by at least one detection electrode S(n) in the first direction, and sequentially selects, in each of the two or more detection electrode groups SG(k), the detection electrodes S(n) allocated to the detection electrode group SG(k) in the first direction; and the position detection means compares the detection voltage levels R(n, m) appearing on each of a set of detection electrodes S(n) and S(n+1) adjacent to each other in the first direction, the detection electrode S(n) having a varied detection voltage level R(n, m), and identifies a detection electrode S(n) of which detection voltage level R(n, m) is varied by the input operation object approaching the detection electrode S(n).

The detection electrodes S(n) adjacent to each other in the first direction are allocated to different detection electrode groups SG(k). When the detection voltage is applied to the selected drive region DV(m), the capacitance detection means detects, in each detection electrode group SG(k), the detection voltage levels R(n, m) of the detection electrodes S(n) allocated to the detection electrode group SG(k). Thus, the detection voltage levels R(n, m) of the adjacent detection electrodes S(n) are each detected after a lapse of at least a select period of each detection electrode group SG(k), and the impulse noise that occurs within the one select period appears only on the detection voltage level R(n, m) of one of the adjacent detection electrodes S(n). On the other hand, the input operation manipulation time required for an approach of an input operation object is far greater than one select period. Thus, among those detection electrodes S(n) of which detection voltage level R(n, m) is varied, it is possible to easily distinguish a detection electrode S(n) of which detection voltage level R(n, m) is varied by an approach of the input operation object from a detection electrode S(n) of which detection voltage level R(n, m) is varied due to noise. This allows for identifying the detection electrode S(n) which the input operation object approaches and detecting the input operation position of the input operation object in the first direction and the second direction irrespective of the occurrence of noise.

The capacitive touch panel according to a ninth aspect of the invention is configured such that the electrode select means operates in either one mode selectable from a typical mode of operation in which the detection electrodes S(n) allocated to two or more detection electrode groups SG(k) are sequentially selected in each of the detection electrode groups SG(k) in the first direction and a high-speed mode of operation in which the detection electrodes S(n) allocated to only any one of the detection electrode groups SG(k) are sequentially selected in the first direction.

The detection electrodes S(n) allocated to each detection electrode group SG(k) are disposed generally on the entire input operation region at equal intervals in the first direction. It is thus possible to detect an input operation position on the entire input operation region by a detection voltage level R(n, m) detected only on the detection electrodes S(n) allocated to any one of the detection electrode groups SG(k).

When the electrode select means operates in the high-speed mode of operation, the detection voltage levels R(n, m) appearing on the detection electrodes S(n) allocated to only any one of the detection electrode groups SG(k) are detected. Thus, one scanning period is shortened, and the input operation position can be detected at high speeds.

According to the invention of the first aspect, without a significant change in the configuration of a conventional capacitive touch panel, it is possible to distinguish between an impulse noise and a common mode noise, using the electrode select means, only by changing the detection order in which the detection voltage levels R(n) appearing on each detection electrode S(n) are detected, and thus highly accurately detect the input operation position without being affected by these noises.

According to the invention of the second aspect, the detection electrodes S(n−1) and S(n+1) of which detection voltage level R(n) is not detected are used as a drive electrode to which the detection voltage is applied. It is thus not necessary to dispose an additional drive electrode other than the detection electrodes S(n), thereby providing a simplified pattern of wiring in the input operation region.

Furthermore, the detection electrodes S(n−1) and S(n+1) employed as a drive electrode to which the detection voltage is applied are disposed to be adjacent to the detection electrode S(n) of which detection voltage level R(n) is detected. It is therefore possible to detect a change in detection voltage level R(n) by the capacitance detection means even when the detection voltage is at a low level. This allows for reducing the influence of unnecessary radiation due to the detection voltage.

According to the invention of the third, fourth, or sixth aspect, the detection voltage applied to the drive electrode on the insulating panel is cancelled out by an AC signal having an inverted detection voltage. It is thus possible to significantly reduce the influence of unnecessary radiation from the insulating panel caused by the application of the detection voltage.

According to the invention of the fifth aspect, the detection of the detection voltage level R(n) of the selected detection electrode S(n) is not affected by the application of the detection voltage to a switched drive electrode. This allows for accurately detecting the input operation position and noise.

According to the invention of the seventh aspect, it is possible to detect the input operation position from the detection voltage levels R(n) appearing only on the detection electrodes S(n) allocated to a particular detection electrode group SG(k) among the plurality of detection electrodes S(n) disposed on the insulating panel. Thus, when a number of detection electrodes S(n) are disposed on a large-area input operation region, it is possible to select a detection mode in which the input operation position is detected at high speeds.

According to the invention of the eighth aspect, without a significant change in the configuration of a conventional capacitive touch panel, it is possible to distinguish between an impulse noise and a common mode noise, using the electrode select means, only by changing the detection order in which the detection voltage levels R(n, m) that appear on each detection electrode S(n) when the detection voltage is applied to the selected drive region DV(m) are detected. It is thus possible to detect the two-dimensional input operation position with high accuracy without being affected by these noises.

According to the invention of the ninth aspect, it is possible to detect the input operation position in the first direction by detecting the detection voltage levels R(n, m) that appear only on the detection electrodes S(n) allocated to a particular detection electrode group SG(k) among the plurality of detection electrodes S(n) disposed on the insulating panel. Thus, when a number of detection electrodes S(n) are disposed on a large-area input operation region, it is possible to select a detection mode in which the input operation position is detected at high speeds.

BRIEF DESCRIPTION OF DRAWINGS

FIG. 3 is an explanatory view illustrating the detection order of detecting a detection voltage level R(n, m) of a drive electrode D(m) to which a detection voltage is applied in each drive region DV(m) and a detection electrode S(n) allocated to a detection electrode group SG(k).

DESCRIPTION OF EMBODIMENTS

Figure 1:
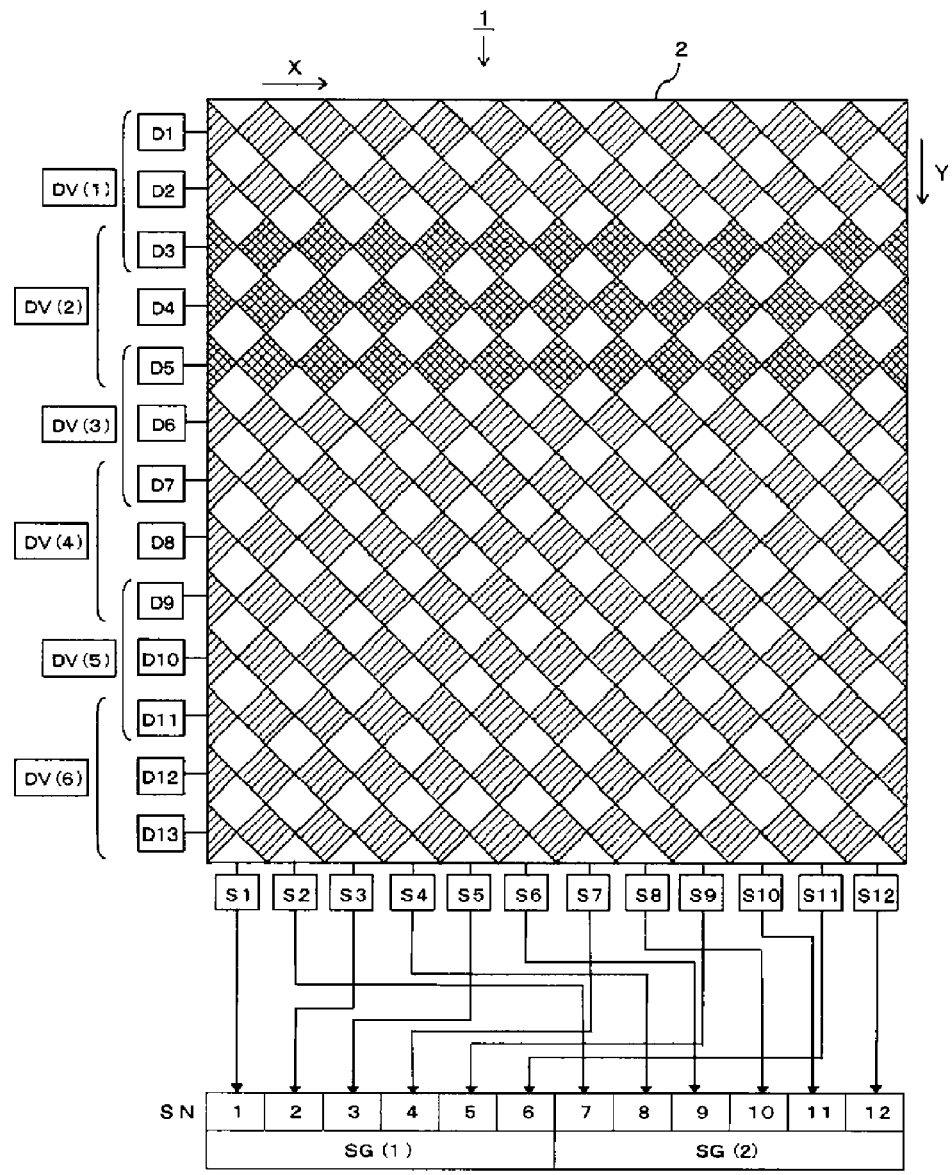
FIG. 1 is a plan view of an input operation region of a capacitive touch panel 1 according to a first embodiment of the present invention, illustrating the relation between a plurality of drive electrodes D(m) disposed therein and drive regions DV(m) and the relation between a plurality of detection electrodes S(n) disposed therein and detection electrode groups SG(k).

Now, referring to FIGS. 1 to 3, a description will be made to a capacitive touch panel 1 according to a first embodiment of the present invention (hereafter referred to as the touch panel 1). As shown in FIG. 1, the touch panel 1 is configured such that twelve detection electrodes S1 to S12 having a series of rhombic patterns in the Y direction (indicated by right-up diagonal lines in the figure) and thirteen drive electrodes D1 to D13 having a series of rhombic patterns in the X direction are disposed to be isolated from each other on an insulating panel 2. The twelve detection electrodes S1 to S12 are disposed at equal pitches in the X direction, and the thirteen drive electrodes D1 to D13 are disposed at equal pitches in the Y direction in a manner such that the series of rhombic patterns of one electrode complements the gaps of the series of rhombic patterns of another electrode so as to appear in a diamond-shape pattern as a whole. For convenience of explanation, the adjacent electrodes are illustrated to be in contact with each other on the edges of the diamond-shape patterns. However, as described above, the electrodes are each disposed to be isolated from each other and continuous only in the direction in which the electrodes are disposed.

The front surface of the detection electrodes S1 to S12 and the drive electrodes D1 to D13 which are disposed on the insulating panel 2 in the shape of a grid is covered with a transparent insulating sheet (not shown) so as to protect these electrodes and prevent an input operation object such as a finger from directly touching these electrodes to thereby cause malfunction. That is, the capacitive touch panel 1 according to this embodiment is configured to receive an input operation by an input operation object being brought into contact with or close proximity to a transparent insulating sheet, and read a change in a detection voltage level R(n, m) appearing on a detection electrode S(n) in the vicinity of the input operation object from a change in the capacitance between the detection electrode S(n) and a drive electrode D(m) caused by the input operation object approaching the same with the transparent insulating sheet therebetween, thereby detecting an input operation position. Under this detection principle, the detection electrodes S1 to S12 and the drive electrodes D1 to D13 each have a wiring pitch that enables an input operation position to be detected from a change in the detection voltage level R(n, m) appearing on the detection electrode S(n) even when an input operation is provided at any position on the insulating panel 2. Here, symbols n and m of the detection electrode S(n) and the drive electrode D(m) are natural numbers which are incremented from one, the numbers representing the sequential order of the electrodes disposed in the X direction and the Y direction of FIG. 1, respectively.

Figure 2:
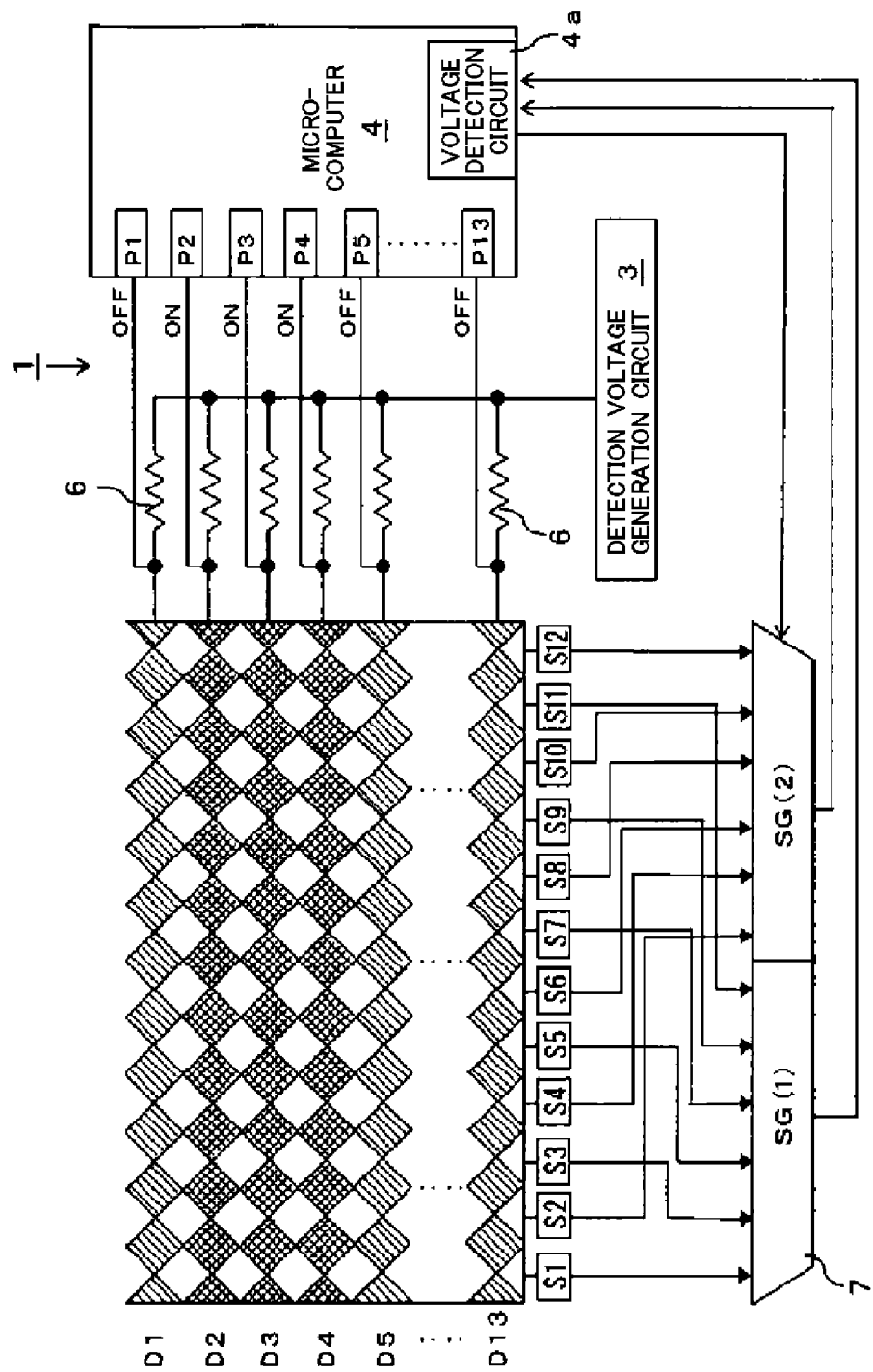
FIG. 2 is a partially omitted circuit diagram illustrating a main portion of the capacitive touch panel 1.

As shown in FIG. 2, the drive electrodes D1 to D13 are each connected through a dumping resistor 6, which eliminates noise, to a detection voltage generation circuit 3 for turning a detection voltage having a pulse height of Vo to a square wave AC signal for output. Furthermore, the connection between each of the drive electrodes D1 to D13 and the dumping resistor 6 is connected with I/O ports P1 to P13 of a microcomputer 4 corresponding to the drive electrodes D1 to D13, respectively.

When I/O ports P are in an OFF mode in which the I/O ports P take an output port state, the potential of the drive electrodes (D1 and D5 to D13 in the figure) connected with the I/O ports is stabilized at the potential of the output port (for example, 0 V at an "L" level and VCC at an "H" level), so that the detection voltage of the square wave AC signal outputted from the detection voltage generation circuit 3 is not applied to the drive electrodes D (D1 and D5 to D13 in the figure) connected to the I/O ports P. Furthermore, when the I/O ports P are in an ON mode in which the I/O ports P take an input port state, the input ports P are in a high impedance state. Thus, the square wave AC signal outputted from the detection voltage generation circuit 3 does not flow into the I/O ports P (P2 to P4 in the figure), so that the detection voltage provided by the square wave AC signal is applied to the drive electrodes D (D2 to D4 in the figure) connected to the I/O ports P. That is, the microcomputer 4 can provide drive control for applying the detection voltage to the drive electrode D connected with the I/O port P only by turning in an arbitrary order any one or more I/O ports P from an output port state to input port state.

In this embodiment, as shown in FIG. 1, three drive electrodes D(m) adjacent to each other in the Y direction are grouped into a drive region DV(m) to which synchronized detection voltages are applied, the drive region DV(m) and the drive region DV(m+1) adjacent to each other in the Y direction are overlapped on the drive electrode D disposed therebetween, and the overlap drive electrode D is included in both the drive regions DV(m) and DV(m+1). In this manner, six types of drive regions DV(m) are set from the thirteen drive electrodes D(m) that are disposed on the insulating panel 2.

As shown in FIG. 3, the microcomputer 4 serving also as the drive control unit turns the I/O ports P that are associated with a drive region DV(m) to an ON mode in the sequential order of the drive regions DV(m) along the Y direction, and outputs synchronized square wave AC signals to each of the three drive electrodes D(m) that constitute the drive region DV(m), thereby applying a detection voltage of a pulse height of Vo thereto. This allows drive control for applying a detection voltage to each of the drive regions DV(m) to be repeated six times, thereby applying a detection voltage to all the drive electrodes D disposed on the insulating panel 2.

As shown in FIG. 1 and FIG. 2, the twelve detection electrodes S(n) are allocated to two types of detection electrode groups SG(k) (k is 1 or 2) in such a manner as to alternately assign thereto the detection electrodes S(n) in the X direction or the direction of detection. That is, the detection electrodes S1, S3, S5, S7, S9, and S11 are allocated to the detection electrode group SG(1) and the detection electrodes S2, S4, S6, S8, S10, and S12 are allocated to the detection electrode group SG(2). The detection electrodes S1, S3, S5, S7, S9, and S11 allocated to the detection electrode group SG(1) are connected to inputs 1 to 6 of a multiplexer 7 sequentially in the order of the wiring positions in the X direction, and the detection electrodes S2, S4, S6, S8, S10, and S12 allocated to the detection electrode group SG(2) are connected to inputs 7 to 12 of the multiplexer 7 sequentially in the order of the wiring positions in the X direction.

When switching control is provided by the microcomputer 4, the multiplexer 7 serving as electrode select means switchingly connects the inputs that are selected in the sequential order of input to a voltage detection circuit 4a of the microcomputer 4 that is connected to the outputs. During the period of drive control provided to each of the drive regions DV(m), the microcomputer 4 sequentially selects a detection electrode S(n) in the X direction from a plurality of detection electrodes S(n) in each of the detection electrode groups SG(1) and SG(2) and then switchingly connects the resulting detection electrode S(n) to the voltage detection circuit 4a of the microcomputer 4.

The voltage detection circuit 4a applies a detection voltage to the three drive electrodes D(m) of a drive region DV(m), thereby reading the pulse height (input voltage Vi) of a square wave AC signal appearing on the detection electrodes S(n) via the capacitance $C_0$ between the drive region DV(m) and the intersecting detection electrodes S(n). Since this capacitance $C_0$ generally has a constant value, the input voltage Vi is the constant voltage Vc proportional to the detection voltage Vo and thus does not vary if there is no variation in the stray capacitance of the detection electrode S(n) when an input operation object such as a finger does not approach the detection electrode S(n). On the other hand, the input operation object approaching between the drive region DV(m), to which drive control is provided, and the detection electrode S(n) causes an increase in capacitance between the drive region DV(m) or the detection electrode S(n) and the input operation object. This causes part of the square wave AC signal to flow to the input operation object with a decrease in the input voltage Vi appearing on the detection electrode S(n). That is, the voltage detection circuit 4a serves as capacitance detection means for reading the input voltage Vi indicative of the capacitance of the detection electrode S(n) connected to voltage detection circuit 4a via the multiplexer 7. The microcomputer 4 represents the input voltage Vi read by the voltage detection circuit 4a in the detection voltage level R(n, m) that is obtained by inverting and binary-coding the potential difference between the input voltage Vi and the constant voltage Vc so as to compute the position of the input operation object or the input operation position from each of the positions of the detection electrode S(n) of which input voltage Vi is varied and the drive region DV(m) to which the detection voltage is then applied.

As shown in FIG. 3, the microcomputer 4 provides sequential drive control to all the drive regions DV(m) in one scanning period Tp, and alternately switches between the detection electrode groups SG(1) and SG(2) in each drive region DV(m). The microcomputer 4 then selects one detection electrode S(n) sequentially from the six detection electrodes S(n), allocated to the switched detection electrode group SG(k), in the order in which the detection electrodes S(n) are disposed in the X direction, thereby switchingly connecting the detection electrode S(n) to the voltage detection circuit 4a of the microcomputer 4. For example, as shown in FIG. 3, the initial first scanning period Tp1 is configured such that during the period of the drive control provided to the drive region DV(1) in which a detection voltage is applied to the drive electrodes D1, D2, and D3, the detection electrodes S1, S3, S5, S7, S9, and S11 allocated to the detection electrode group SG(1) are sequentially connected to the voltage detection circuit 4a. Thereafter, during the period of the drive control provided to the drive region DV(2) (indicated in mesh in FIG. 1) in which a detection voltage is applied to the drive electrodes D3, D4, and D5, the detection electrodes S2, S4, S6, S8, S10, and S12 allocated to the detection electrode group SG(2) are sequentially connected to the voltage detection circuit 4a. From then onward, the switching connection is repeated in the same manner while drive control is provided to the drive regions DV(m) from DV(3) to DV(6).

The drive control to the drive region DV(m) and the selection of the detection electrode S(n) are repeated in the first scanning period Tp1 as described above, thereby making it possible to obtain the detection electrode S(n) disposed to intersect the entire input operation region and the detection voltage level R(n, m) of each drive region DV(m) from the voltage detection circuit 4a. Here, since the detection voltage level R(n, m) represents the amount of a change in the input voltage Vi appearing on the detection electrode S(n) intersecting the drive region DV(m) while the drive region DV(m) is being provided with drive control, an input operation object approaching the intersection of the drive region DV(m) and the detection electrode S(n) causes an increase in the detection voltage level R(n, m). The microcomputer 4 serving also as position detection means makes comparisons among n×m detection voltage levels R(n, m) which are made up of combinations of the detection electrodes S(n) and the drive regions DV(m), and detects, as an input operation position (x, y), the vicinity of the intersection at which the relative maximum value is detected.

As described above, the detection electrode S(n) and the detection electrode S(n+1) adjacent to each other in the X direction are not switchingly connected to the voltage detection circuit 4a in this order unlike the conventional case, but are connected thereto after a lapse of a certain period (in this embodiment, the period required to completely sequentially select all the detection electrodes S(n) allocated to one type of detection electrode group SG(k), herein referred to as one select period). A detection voltage level R(n, m) and a detection voltage level R(n+1, m) which are detected after a lapse of a certain period can be compared, thereby allowing for distinguishing various types of noises from the approaching input operation object that causes both the levels to vary in the same manner. For example, suppose that an impulse noise has occurred while the input 8 of the multiplexer 7 is connected to the output and the selected detection electrode S4 is connected to the voltage detection circuit 4a during one select period. In this case, the detection voltage level R(4, 2) takes an irregularly changed abnormal value due to the noise contained therein when compared with the detection voltage level R(3, 1) and the detection voltage level R(3, 3) which are detected on the adjacent detection electrode S3 or the detection voltage level R(5, 1) and the detection voltage level R(5, 3) which are detected on the adjacent detection electrode S5. Thus, the detection voltage level R(4, 2) is determined as an abnormal value containing noise and not employed to detect the input operation position (x, y).

For example, in FIG. 3, suppose that an impulse noise has occurred in the duration from the point in time at which the detection voltage level R(3, 1) of the detection electrode S3 is detected during the period of the drive control provided to the drive region DV(1) to the point in time at which the detection voltage level R(5, 1) of the detection electrode S5 selected as the next detection electrode is detected. In this case, detected as the detection voltage level R(3, 1) and the detection voltage level R(5, 1) are those values that have been affected by the impulse noise. However, the detection voltage level R(4, 2) of the detection electrode S4 located between the detection electrode S3 and the detection electrode S5 is detected after the period of time equivalent to one select period. Thus, the impulse noise has already disappeared at the point in time at which the detection voltage level R(4, 2) is detected, and a normal value that is not affected by the impulse noise is detected as the detection voltage level R(4, 2). After a series of those voltage levels has been detected, the detection voltage level R(3, 1) corresponding to the detection electrode S3, the detection voltage level R(4, 2) corresponding to the detection electrode S4, and the detection voltage level R(5, 1) corresponding to the detection electrode S5 may be arranged in the sequential order in which the detection electrodes are provided. In this case, an abnormal change in detection voltage level which is caused by an approach of an input operation object and clearly different from a normal change in detection value can be identified on the detection voltage level R(3, 1) and the detection voltage level R(5, 1) which have been affected by the impulse noise and the detection voltage level R(4, 2) which has not been affected thereby. It can thus be very easily determined that the detection voltage level has been affected by the impulse noise between the point in time at which the detection voltage level R(3, 1) is detected and the point in time at which the detection voltage level R(5, 1) is detected. In contrast to this, suppose in the same manner as above that the detection electrode S3 and the detection electrode S4 are continually detected in this order as in a conventional case. In this case, both the detection voltage level R(3) and the detection voltage level R(4) corresponding to the detection electrode S3 and the detection electrode S4 which are adjacent to each other take on a value affected by the noise. It is thus difficult to determine whether the change is a normal change in the detection value caused by an approaching input operation object or an abnormal change in the value affected by the impulse noise.

Furthermore, even when like a common mode noise, a noise having a period longer than one select period has occurred, the detection electrode S(n) and the detection electrode S(n+1) adjacent to each other in the X direction have the detection voltage level R(n, m) and the detection voltage level R(n+1, m) which are each detected and between which a difference due to noise may occur. It is thus possible to distinguish an elongated period noise. When an elongated period noise is detected, the input operation position may be detected by excluding a plurality of detection voltage levels R(n, m) affected by the noise, or the waveform of the noise can also be identified from the noise-carrying detection voltage levels R(n, m) that are continually detected, and then the input operation position (x, y) can be detected from the detection voltage level R(n, m) from which the amplitude of the noise has been excluded.

Note that in this embodiment, as shown in FIG. 3, in the next second scanning period Tp2 subsequent to the first scanning period Tp1, the order of the detection electrode groups SG(k) to be switched therebetween in each drive region DV(m) is varied so as to connect, to the voltage detection circuit 4a, one detection electrode S(n) that is sequentially selected from the six detection electrodes S(n) allocated to the switched detection electrode group SG(k). For example, in the first scanning period Tp1, the detection electrodes S(n) that are allocated to the detection electrode group SG(1) when drive control is provided to the drive region DV(1) are connected to the voltage detection circuit 4a in the sequential order of positions in which the detection electrodes S(n) are disposed in the X direction. In contrast, in the next second scanning period Tp2, the detection electrodes S(n) that are allocated to the detection electrode group SG(2) when drive control is provided to the drive region DV(1) are connected to the voltage detection circuit 4a prior to the detection electrode group SG(1).

In this manner, in the second scanning period Tp2, when each detection electrode S(n) is connected to the voltage detection circuit 4a, a detection voltage is applied to the drive regions DV(m) that are adjacent to each other in the Y direction when compared with the first scanning period Tp1, so that throughout the first scanning period Tp1 and the second scanning period Tp2, the microcomputer 4 obtains the n-row and m-column detection voltage levels R(n, m) corresponding to the positions in the entire input operation region on the insulating panel 2. Each position in the input operation region and the detection voltage levels R(n, m) corresponding to positions around that position are obtained by the microcomputer 4 after a lapse of time, i.e., at least one select period or one scanning period Tp in which the detection electrode groups SG(k) are switched over. It is thus possible to compare these detection voltage levels R(n, m) and positively detect a noise occurring therebetween, thereby removing the noise.

However, it is not always necessary to detect the input operation position (x, y) by alternately repeating the first scanning period Tp1 and the second scanning period Tp2. As described above, the input operation position (x, y) can be detected only in the first scanning period Tp1 or the second scanning period Tp2 without being affected by noise. Furthermore, to detect the input operation position (x, y) at high speeds, the electrode select means is turned into a high-speed mode of operation in which the detection electrodes S(n) of only any one of the detection electrode groups SG(k) are connected to the voltage detection circuit 4a. For example, only the six detection electrodes S(n) that are allocated to one of the detection electrode group SG(1) and the detection electrode group SG(2) according to the aforementioned first embodiment may be connected to the voltage detection circuit 4a so as to detect the input operation position (x, y) from the detection voltage levels R(n, m) appearing on these detection electrodes S(n). When only either the detection electrode group SG(1) or the detection electrode group SG(2) is connected to the voltage detection circuit 4a, it is possible to detect the input operation position (x, y) across the entire input operation region in half the scanning period Tp according to the first embodiment.

This embodiment is configured such that synchronized detection voltages are applied to three electrodes in the drive region DV(m). However, the number of electrodes that constitute the drive region DV(m) is not limited to three, but only one electrode may also constitute the drive region DV(m) to which a detection voltage is applied.

In the aforementioned embodiment, a description was made to the touch panel 1 in which a plurality of detection electrodes S(n) and a plurality of drive electrodes D(m) are disposed so as to intersect each other on the insulating panel 2. However, the present invention is also applicable even to a touch panel in which the detection electrode S also serves as the drive electrode D. Now, referring to FIG. 4, a description will be made to a capacitive touch panel 10 (hereafter referred to as the touch panel 10) according to a second embodiment of the present invention in which the detection electrode S(n) also serves as the drive electrode D. Hereinafter, in the second embodiment, the same or similarly operating configurations as those of the aforementioned touch panel 1 will be denoted by the same reference numerals and will not be repeatedly detailed.

Figure 4:
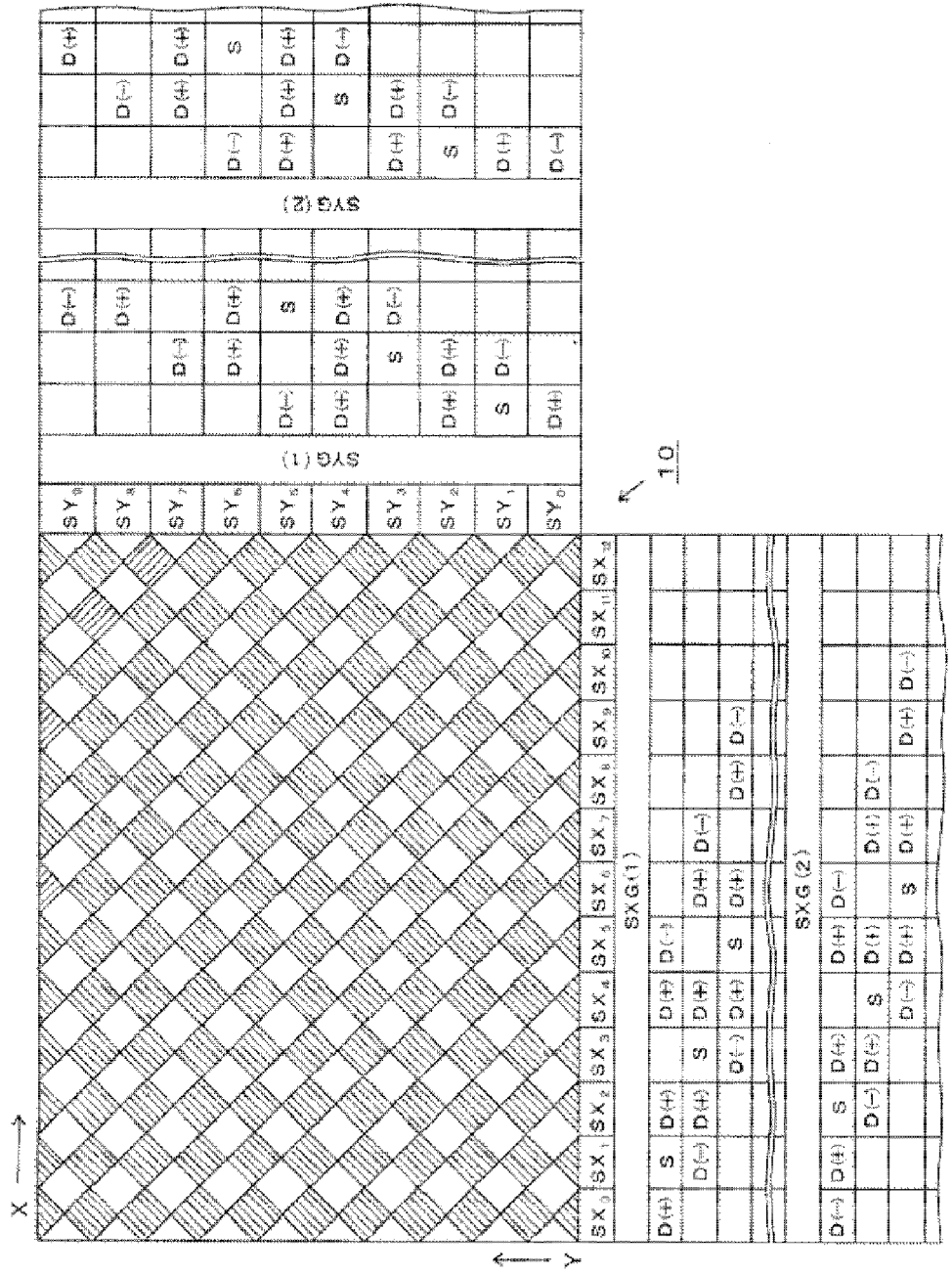
FIG. 4 is an explanatory view of a plurality of detection electrodes SX(n) disposed at equal intervals in the X direction and a plurality of detection electrodes SY(n) disposed at equal intervals in the Y direction in an input operation region of a capacitive touch panel 10 according to a second embodiment of the present invention, illustrating the relation between a detection electrode S(n) for detecting a detection voltage level R(n) and a drive electrode D+ to which a detection voltage is applied.

As shown in FIG. 4, the touch panel 10 is configured such that thirteen X detection electrodes SX0 to SX12 having a series of rhombic patterns (indicated by diagonally right-up lines in the figure) on the insulating panel 2 in the Y direction and ten Y detection electrodes SY0 to SY9 having a series of rhombic patterns in the X direction are disposed to be isolated from each other. The thirteen X detection electrodes SX0 to SX12 are disposed at equal pitches in the X direction and the ten Y detection electrodes SY0 to SY9 are disposed at equal pitches in the Y direction so that the series of the rhombic patterns of one detection electrode complements the gaps of the series of the rhombic patterns of another detection electrode so as to appear in a diamond-shape pattern as a whole. In FIG. 4, for convenience of explanation, the adjacent detection electrodes S(n) are also illustrated to be in contact with each other on the edges of the diamond-shape pattern. However, each of the detection electrodes S(n) are disposed to be isolated from each other and continuous only in the direction in which the detection electrodes S(n) are disposed. Here, the symbol n of the detection electrode S(n) is a natural number to be incremented from one that represents the detection electrodes S in the sequential order in which the detection electrodes S are disposed in the directions of detection in the figure, i.e., the X direction and the Y direction.

The touch panel 10 according to this embodiment employs any one detection electrode S(n) as a selected detection electrode S(n) to be connected to the voltage detection circuit 4a. Then, the detection electrodes S(n−1) and S(n+1) on both the sides of the selected detection electrode S(n) in the direction of detection are defined as the drive electrodes D+ to which a detection voltage is applied. A change in the detection voltage level R(n) appearing on the selected detection electrode S(n) in the vicinity of an input operation object is read from a change in the capacitance between the detection electrode S(n) and the drive electrodes D(+) caused by an approach of the input operation object, thereby detecting the input operation position.

In this embodiment, the detection voltage generation circuit 3 that turns the detection voltage of a pulse height of Vo to a square wave AC signal for output is included in the microcomputer 4. The microcomputer 4 includes an output port P1 for outputting a detection voltage and an output port P2 for outputting an inverted detection voltage having an opposite phase with respect to the detection voltage. As described above, the X detection electrode SX(n) and the Y detection electrode SY(n) also serve as the selected detection electrode S(n) connected to the voltage detection circuit 4a of the microcomputer 4 and the drive electrode D(+) to which the detection voltage is applied and as well serve as the drive electrode D(−) to which the inverting detection voltage having an opposite phase with respect to the detection voltage is applied. Thus, each of all the detection electrodes S(n) can be selectively connected to any one of the output port P1, the output port P2, and the voltage detection circuit 4a of the microcomputer 4 through a plurality of multiplexers 7 (not shown) which is provided with switching control by the microcomputer 4.

Now, a description will be made to the operation of the touch panel 10 which allows the touch panel 10 to detect an input operation position on the insulating panel 2. In the operation of detecting an input operation position, the X detection electrodes SX1 to SX11 excluding the X detection electrodes SX0 and SX12 located on both the ends are allocated to two types of detection electrode groups SXG(k) (k is 1 or 2) by alternately assigning the detection electrodes SX(n) to the groups in the X direction or the direction of detection. That is, the detection electrodes SX1, SX3, SX5, SX7, SX9, and SX11 are allocated to the detection electrode group SXG(1), and the detection electrodes SX2, SX4, SX6, SX8, SX10, and SX12 are allocated to the detection electrode group SG(2). To detect an input operation position in the X direction, the detection electrodes SX(n) allocated to each detection electrode group SXG(k) are selected in each detection electrode group SXG(k) by the microcomputer 4 serving as the electrode select means in the sequential order of the positions at which the detection electrodes SX(n) are disposed in the X direction or the direction of detection, and are then switchingly connected by the multiplexer 7 to the voltage detection circuit 4a of the microcomputer 4.

When the microcomputer 4 has selected a particular detection electrode SX(n), the microcomputer 4 provides switching connection control to the multiplexer 7 so as to connect the selected detection electrode SX(n) to the voltage detection circuit 4a. At the same time, the detection electrode SX(n−1) and the detection electrode SX(n+1) on both the sides of the selected detection electrode SX(n) as well as the detection electrode SX(n+3) adjacent to the detection electrode SX(n+2) to be subsequently selected are connected to the output port P1 so as to employ the electrodes as the drive electrodes. The detection electrode SX(n−2) and the detection electrode SX(n+4) on both the sides of the drive electrodes are connected to the output port P2 so as to apply an inverted detection voltage to the detection electrodes. For example, as shown in FIG. 4, when the detection electrode SX3 of the detection electrode group SXG(1) is selected, the detection electrode SX3 is connected to the voltage detection circuit 4a. At the same time, the detection electrode SX2 and the detection electrode SX4 on both the sides of the detection electrode SX3 as well as the detection electrode SX6 adjacent to the detection electrode SX5 to be subsequently selected are employed as a drive electrode to which a detection voltage is applied. An inverted detection voltage is applied to the detection electrode SX1 and the detection electrode SX7 located outside and adjacent to the detection electrode SX2 and the detection electrode SX6, respectively, which have been employed as a drive electrode.

Thus, with the detection voltage applied to the detection electrode SX(n−1) and the detection electrode SX(n+1) on both the sides of the selected detection electrode SX(n), the voltage detection circuit 4a reads the pulse height (the input voltage Vi) of the square wave AC signal appearing on the selected detection electrode SX(n) via the capacitance $C_0$ between the selected detection electrode SX(n) and the detection electrodes SX(n−1) and SX(n+1). In order to compute an input operation position from the position of the detection electrode SX(n) that is varied in the input voltage Vi, the voltage detection circuit 4a turns the input voltage Vi read by the voltage detection circuit 4a into a detection voltage level RX(n) that is obtained by inverting and binary-coding the potential difference between the input voltage Vi and the constant voltage Vc. Here, the detection electrodes SX(n−1), SX(n+1), and SX(n+3) which are employed as a drive electrode are allocated to a detection electrode group SXG(k) that is different from the one to which the detection electrode SX(n) for reading the detection voltage level RX(n) is allocated. The detection electrodes SX(n−1), SX(n+1), and SX(n+3) are not connected to the voltage detection circuit 4a within this select period, and thus the detection voltage can be applied without taking into account the exact timing of the application.

Furthermore, since an inverted detection voltage having an opposite phase with respect to the detection voltage is applied to the detection electrode SX(n−2) and the detection electrode SX(n+4) outside the detection electrodes SX(n−1) and SX(n+3) to which the detection voltage is applied, the AC signals of the detection voltage and the inverted detection voltage are cancelled out by each other therearound, thereby allowing for significantly reducing the influence of unnecessary radiation from the touch panel 10.

When having read the detection voltage level RX(n) appearing on the selected detection electrode SX(n), the microcomputer 4 newly selects the detection electrode SX(n+2) of the same detection electrode group SXG(k) that is located at the position of disposition next to the selected detection electrode SX(n) in the X direction, connects the detection electrode SX(n+2) to the voltage detection circuit 4a, and repeats the same processing. At this time, the drive electrodes to which the detection voltage is applied are shifted from the detection electrodes SX(n−1), SX(n+1), and SX(n+3) to the detection electrodes SX(n+1), SX(n+3), and SX(n+5). However, since the detection voltage has already been applied to the detection electrodes SX(n+1) and SX(n+3) on both the sides of the selected detection electrode SX(n+2) on which the detection voltage level RX (n+2) is read, the noise to be caused by the additional application of the detection voltage will not appear on the detection voltage level R(n+2).

In this manner, the detection voltage levels RX(n) are sequentially read on all the detection electrodes SX1, SX3, SX5, SX7, SX9, and SX11 allocated to the detection electrode group SXG(1). After that, the detection voltage levels RX(n) are sequentially read on all the detection electrodes SX2, SX4, SX6, SX8, and SX10 allocated to the detection electrode group SXG(2). Thus, the detection voltage levels RX(n) on each detection electrode SX(n) are obtained in the X direction across the entire input operation region. Here, since the detection voltage level RX(n) represents a change in the amount of the input voltage Vi appearing on the detection electrode SX(n), an input operation object approaching the detection electrode SX(n) causes an increase in the detection voltage level RX(n). The microcomputer 4 serving also as the position detection means makes comparisons among the detection voltage levels RX(n) of each of the detection electrodes SX(n), and detects the vicinity of the detection electrode SX(n), on which the relative maximum value is detected, as the input operation position (x) in the X direction.

Likewise, in the Y direction, the Y detection electrodes SY1 to SY8 excluding the Y detection electrodes SY0 and SY9 on both the ends are allocated to two types of detection electrode groups SYG(k) (k is 1 or 2) in such a matter as to alternately assign the detection electrodes SY(n) into the groups in the Y direction or the direction of detection. That is, the detection electrodes SY1, SY3, SY5, and SY7 are allocated to the detection electrode group SYG (1), and the detection electrodes SY2, SY4, SY6, and SY8 are allocated to the detection electrode group SG(2). To detect an input operation position in the Y direction, the detection electrodes SY(n) allocated to each detection electrode group SYG(k) are selected in each detection electrode group SYG(k) by the microcomputer 4 serving as the electrode select means in the sequential order of the positions of disposition in the Y direction or the direction of detection, and are then switchingly connected to the voltage detection circuit 4a.

When the microcomputer 4 has selected a particular detection electrode SY(n), the microcomputer 4 connects the selected detection electrode SY(n) to the voltage detection circuit 4a. At the same time, the detection electrode SY(n−1) and the detection electrode SY(n+1) on both the sides of the selected detection electrode SY(n) as well as the detection electrode SY(n+3) adjacent to the detection electrode SY(n+2) to be subsequently selected are connected to the output port P1 so as to be employed as the drive electrodes. The detection electrode SY(n−2) and the detection electrode SY(n+3) on both the sides of the drive electrodes are connected to the output port P2 so as to apply an inverted detection voltage thereto.

With the detection voltage applied to the detection electrode SY(n−1) and the detection electrode SY(n+1) on both the sides of the selected detection electrode SY(n), the voltage detection circuit 4a reads the input voltage Vi appearing on the selected detection electrode SY(n) via the capacitance $C_0$ between the selected detection electrode SY(n) and the detection electrodes SY(n−1) and SY(n+1). The voltage detection circuit 4a turns the input voltage Vi read thereby into a detection voltage level RY(n) that is obtained by inverting and binary-coding the potential difference between the input voltage Vi and the constant-voltage Vc.

Furthermore, an inverted detection voltage having an opposite phase with respect to the detection voltage is applied to the detection electrode SY(n−2) and the detection electrode SY(n+3) outside the detection electrodes SY(n−1) and SY(n+2) to which the detection voltage is applied. Thus, the unnecessary radiation from the touch panel 10 caused by the detection voltage being applied thereto is also reduced in the Y direction.

When having read the detection voltage level RY(n) appearing on the selected detection electrode SY(n), the microcomputer 4 newly selects the detection electrode SY(n+2) of the same detection electrode group SYG(k) that is located at the position of disposition next to the selected detection electrode SY(n) in the Y direction, connects the detection electrode SY(n+2) to the voltage detection circuit 4a, and repeats the same processing.

In this embodiment, the detection voltage levels RY(n) are read sequentially on all the detection electrodes SY1, SY3, SY5, and SY7 allocated to the detection electrode group SYG(1) in this manner. After that, the detection voltage levels RY(n) are sequentially read on all the detection electrodes SY2, SY4, SY6, and SY8 allocated to the detection electrode group SYG(2). Thus, the detection voltage levels RY(n) on each detection electrode SY(n) are obtained in the Y direction across the entire input operation region. Here, since the detection voltage level RY(n) represents a change in the amount of the input voltage Vi appearing on the detection electrode SY(n), an input operation object approaching the detection electrode SY(n) causes an increase in the detection voltage level RY(n). The microcomputer 4 serving also as the position detection means makes comparisons among the detection voltage levels RY(n) of each of the detection electrodes SY(n), and detects the vicinity of the detection electrode SY(n), on which the relative maximum value is detected, as the input operation position (y) in the Y direction.

In the second embodiment, the detection electrode SX(n) and the detection electrode SX(n+1) adjacent to each other in the X direction and the detection electrode SY(n) and the detection electrode SY(n+1) adjacent to each other in the Y direction are also each connected to the voltage detection circuit 4a after a lapse of one select period. Thus, comparisons can be made between the detection voltage level RX(n) and the detection voltage level RX (n+1) which are detected after a lapse of a certain period or between the detection voltage level RY(n) and the detection voltage level RY (n+1), thereby distinguishing various types of noises from an approach of an input operation object that causes both the levels to vary generally in the same manner. It is thus possible to detect the input operation position (x, y) in the X and Y directions from the detection voltage levels RX(n) and RY(n) from which noises have been removed.

Note that in the second embodiment, the electrode select means of the microcomputer 4 may be turned into the high-speed mode of operation, and the detection electrodes SX(n) allocated to any one of the detection electrode groups SXG(k) in the X direction and the detection electrodes SY(n) allocated to any one of the detection electrode groups SYG(k) in the Y direction may be sequentially connected to the voltage detection circuit 4a. At the point in time at which the detection voltage levels RX(n) and RY(n) that each appear are detected, the input operation position (x, y) is detected in the X and Y directions, and scanning of all the disposed detection electrodes SX(n) and detection electrodes SY(n) may be omitted so as to detect the input operation position (x, y) at high speeds.

Furthermore, in the second embodiment, the detection electrodes S(n−1) and S(n+1) on both the sides of the detection electrode S(n) that is selected and connected to the voltage detection circuit 4a are employed as the drive electrodes. However, only one of the detection electrodes S(n−1) and S(n+1) may also be employed as a drive electrode to which the detection voltage is applied.

Furthermore, in both the embodiments above, descriptions were made to the case where a plurality of detection electrodes S(n) are allocated to the two types of detection electrode groups SYG(k) (k is 1 or 2). However, the plurality of detection electrodes S(n) may also be allocated to three or more types of detection electrode groups SYG(k) (k is an integer equal to three or greater) if the detection electrodes S(n) to be allocated to each detection electrode group SYG(k) are disposed at equal intervals and spaced apart from each other by at least one detection electrode S(n) in the direction of detection.

Furthermore, in each of the aforementioned embodiments, descriptions were made to the case where the detection voltage generation circuit 3 outputs the square wave AC signal. However, the AC signal is not limited to the square wave, but for example, the signal may also be an AC signal in another forms such as a sinusoidal one.

INDUSTRIAL APPLICABILITY

The present invention is suitable for a capacitive touch panel which employs the mutual capacitance scheme to detect the position of an input operation.

REFERENCE SIGNS LIST

1 Capacitive touch panel (first embodiment)
2 Insulating panel
3 Detection voltage generation circuit 4 Microcomputer (drive control unit, electrode select means)
4a Voltage detection circuit (capacitance detection means)
5 Drive control unit
7 Multiplexer (electrode select means)
10 Capacitive touch panel (second embodiment)
DV(m) Drive region
S(n) Detection electrode
SG(k) Detection electrode group
R(n) Detection voltage level appearing on detection electrode S(n)
DV(m) Drive region

The invention claimed is:

1. A capacitive touch panel comprising:
a plurality of detection electrodes S(n) disposed at equal intervals in a direction of detection on an insulating panel;
a detection voltage generation circuit for generating an AC detection voltage;
drive electrodes disposed to be insulated from the plurality of detection electrodes S(n);
a drive control unit for applying a detection voltage to the drive electrodes;
electrode select means for selecting a particular detection electrode S(n) sequentially from the plurality of detection electrodes S(n);
capacitance detection means for detecting a detection voltage level R(n) of a detection voltage appearing on a detection electrode S(n) selected by the electrode select means; and
position detection means for identifying a detection electrode S(n) from the plurality of detection electrodes S(n), the detection electrode S(n) having a detection voltage level R(n) varied due to a change in capacitance between the selected detection electrode S(n) and a drive electrode in a vicinity thereof to which the detection voltage is applied, the change being caused by an input operation object approaching the detection electrode S(n), the position detection means detecting an input operation position of the input operation object from a position at which the identified detection electrode S(n) is disposed in the direction of detection on the insulating panel, wherein
the electrode select means allocates the plurality of detection electrodes S(n) to any one of two or more detection electrode groups SG(k) including a first detection electrode group and a second detection electrode group so that the detection electrodes S(n) allocated to each detection electrode group SG(k) are disposed at equal intervals and spaced apart from each other at least by one detection electrode S(n) in the direction of detection, and, in each of the two or more detection electrode groups SG(k), sequentially selects the detection electrodes S(n) allocated to the detection electrode group SG(k) in the direction of detection by sequentially selecting all the detection electrodes allocated to the second detection electrode group in the direction of detection after sequentially selecting all the detection electrodes allocated to the first detection electrode group in the direction of detection; and
the position detection means makes a comparison between detection voltage levels R(n) each appearing on a set of detection electrodes S(n) and S(n+1) which are adjacent in the direction of detection to the detection electrode S(n) having a varied detection voltage level R(n), and identifies the detection electrode S(n) which is varied in detection voltage level R(n) by an approach of the input operation object.

2. The capacitive touch panel according to claim 1, wherein
the electrode select means alternately allocates the plurality of detection electrodes S(n) one by one to two types of detection electrode groups SG(1) and SG(2) in the direction of detection; and
when the electrode select means selects the detection electrode S(n) allocated to one of the detection electrode groups SG(1) and SG(2), the drive control unit employs, as a drive electrode, at least either one of detection electrodes S(n−1) and S(n+1) which are allocated to another detection electrode group SG(2) or SG(1) and disposed on both the sides of the selected detection electrode S(n) in the direction of detection, and applies a detection voltage thereto.

3. A capacitive touch panel comprising:
a plurality of detection electrodes S(n) disposed at equal intervals in a direction of detection on an insulating panel;
a detection voltage generation circuit for generating an AC detection voltage;
drive electrodes disposed to be insulated from the plurality of detection electrodes S(n);
a drive control unit for applying a detection voltage to the drive electrodes;
electrode select means for selecting a particular detection electrode S(n) sequentially from the plurality of detection electrodes S(n);
capacitance detection means for detecting a detection voltage level R(n) of a detection voltage appearing on a detection electrode S(n) selected by the electrode select means; and
position detection means for identifying a detection electrode S(n) from the plurality of detection electrodes S(n), the detection electrode S(n) having a detection voltage level R(n) varied due to a change in capacitance between the selected detection electrode S(n) and a drive electrode in a vicinity thereof to which the detection voltage is applied, the change being caused by an input operation object approaching the detection electrode S(n), the position detection means detecting an input operation position of the input operation object from a position at which the identified detection electrode S(n) is disposed in the direction of detection on the insulating panel, wherein
the electrode select means allocates the plurality of detection electrodes S(n) to any one of two or more detection electrode groups SG(k) so that the detection electrodes S(n) allocated to each detection electrode group SG(k) are disposed at equal intervals and spaced apart from each other at least by one detection electrode S(n) in the direction of detection, and, in each of the two or more detection electrode groups SG(k), sequentially selects the detection electrodes S(n) allocated to the detection electrode group SG(k) in the direction of detection;
the position detection means makes a comparison between detection voltage levels R(n) each appearing on a set of detection electrodes S(n) and S(n+1) which are adjacent in the direction of detection to the detection electrode S(n) having a varied detection voltage level R(n), and identifies the detection electrode S(n) which is varied in detection voltage level R(n) by an approach of the input operation object;

the electrode select means alternately allocates the plurality of detection electrodes S(n) one by one to two types of detection electrode groups SG(1) and SG(2) in the direction of detection;

when the electrode select means selects the detection electrode S(n) allocated to one of the detection electrode groups SG(1) and SG(2), the drive control unit employs, as a drive electrode, at least either one of detection electrodes S(n−1) and S(n+1) which are allocated to another detection electrode group SG(2) or SG(1) and disposed on both the sides of the selected detection electrode S(n) in the direction of detection, and applies a detection voltage thereto; and the drive control unit applies an inverted detection voltage having an opposite phase with respect to the detection voltage to at least one of the detection electrodes S(n).

4. The capacitive touch panel according to claim 3, wherein with at least either one of the detection electrodes S(n−1) and S(n+1) employed as a drive electrode, the drive control unit applies the inverted detection voltage having an opposite phase with respect to the detection voltage to at least either one of detection electrodes S(n−2) and S(n+2) which are allocated to one of the detection electrode groups SG(1) and SG(2) and disposed on both the sides of the detection electrodes S(n−1) and S(n+1) in the direction of detection.

5. The capacitive touch panel according to claim 2, wherein when the electrode select means selects a detection electrode S(n) allocated to one of the detection electrode groups SG(1) and SG(2), the drive control unit employs, as a drive electrode, at least either one of detection electrodes S(n+1) and S(n+3) which are allocated to the other detection electrode group SG(2) or SG(1) and disposed on both the sides along the direction of detection of a detection electrode S(n+2) to be selected subsequent to the selected detection electrode S(n), and applies a detection voltage thereto.

6. The capacitive touch panel according to claim 3, wherein with at least either one of the detection electrodes S(n+1) and S(n+3) employed as a drive electrode, the drive control unit applies the inverted detection voltage having an opposite phase with respect to the detection voltage to at least either one of detection electrodes S(n+2) and S(n+4) which are allocated to one of the detection electrode groups SG(1) and SG(2) and disposed on both the sides of the detection electrode S(n+3) in the direction of detection.

7. The capacitive touch panel according to claim 1, wherein the electrode select means operates in either one mode selectable from a typical mode of operation in which the detection electrodes S(n) allocated to two or more detection electrode groups SG(k) are sequentially selected in each of the detection electrode groups SG(k) in the direction of detection and a high-speed mode of operation in which the detection electrodes S(n) allocated to only any one of the detection electrode groups SG(k) are sequentially selected in the direction of detection.

8. A capacitive touch panel comprising:
a plurality of detection electrodes S(n) which are disposed on an insulating panel in a second direction orthogonal to a first direction so as to be at equal intervals in the first direction;
a detection voltage generation circuit for generating an AC detection voltage;
a plurality of drive regions DV(m) which are disposed in the first direction so as to be at equal intervals in the second direction of the insulating panel, the drive regions DV(m) intersecting all the plurality of detection electrodes S(n) with an insulation separation therebetween;
a drive control unit for selecting a particular drive region DV(m) from the plurality of drive regions DV(m) and applying a detection voltage to the selected drive region DV(m);
electrode select means for selecting a particular detection electrode S(n) sequentially from the plurality of detection electrodes S(n);
capacitance detection means which, when the drive control unit applies the detection voltage to the selected drive region DV(m), detects a detection voltage level R(n, m) of a detection voltage appearing on the detection electrode S(n) selected by the electrode select means; and
position detection means for identifying, from the plurality of detection electrodes S(n), a detection electrode S(n) of which detection voltage level R(n, m) is varied due to a change in capacitance caused by an approach of an input operation object between the selected detection electrode S(n) and the drive region DV(m) in a vicinity thereof to which the detection voltage is applied, the position detection means detecting an input operation position in the first direction and the second direction of the input operation object from a position (n) at which the identified detection electrode S(n) is disposed in the first direction on the insulating panel and a position (m) at which the drive region DV(m) with the detection voltage applied thereto is disposed in the second direction on the insulating panel, wherein the electrode select means allocates the plurality of detection electrodes S(n) to any one of two or more detection electrode groups SG(k) including a first detection electrode group and a second detection electrode group so that the detection electrodes S(n) to be allocated to each of the detection electrode groups SG(k) are disposed at equal intervals and spaced apart from each other by at least one detection electrode S(n) in the first direction, and sequentially selects, in each of the two or more detection electrode groups SG(k), the detection electrodes S(n) allocated to the detection electrode group SG(k) in the first direction by sequentially selecting all the detection electrodes allocated to the second detection electrode group in the first direction after sequentially selecting all the detection electrodes allocated to the first detection electrode group in the first direction; and the position detection means compares the detection voltage levels R(n, m) appearing on each of a set of detection electrodes S(n) and S(n+1) adjacent to each other in the first direction, the detection electrode S(n) having a varied detection voltage level R(n, m), and identifies a detection electrode S(n) of which detection voltage level R(n, m) is varied by the input operation object approaching the detection electrode S(n).

9. The capacitive touch panel according to claim 8, wherein the electrode select means operates in either one mode selectable from a typical mode of operation in which the detection electrodes S(n) allocated to two or more detection electrode groups SG(k) are sequentially selected in each of the detection electrode groups SG(k) in the first direction and a high-speed mode of operation in which the detection electrodes S(n) allocated to only any one of the detection electrode groups SG(k) are sequentially selected in the first direction.

* * * * *